(12) United States Patent
Hicks et al.

(10) Patent No.: US 10,990,510 B2
(45) Date of Patent: Apr. 27, 2021

(54) ASSOCIATING ATTRIBUTE SEEDS OF REGRESSION TEST CASES WITH BREAKPOINT VALUE-BASED FINGERPRINTS

(71) Applicant: INTERNATIONAL BUSINESS MACHINES CORPORATION, Armonk, NY (US)

(72) Inventors: Andrew Hicks, Wappingers Falls, NY (US); Dale E. Blue, Poughkeepsie, NY (US); Ryan Rawlins, New Paltz, NY (US); Steven Partlow, Beacon, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/440,857

(22) Filed: Jun. 13, 2019

(65) Prior Publication Data
US 2020/0394121 A1    Dec. 17, 2020

(51) Int. Cl.
*G06F 9/44* (2018.01)
*G06F 11/36* (2006.01)

(52) U.S. Cl.
CPC ...... *G06F 11/3664* (2013.01); *G06F 11/3676* (2013.01); *G06F 11/3688* (2013.01)

(58) Field of Classification Search
CPC ............. G06F 11/3676; G06F 11/3688; G06F 11/3692
USPC ................................................ 717/124–140
See application file for complete search history.

(56) References Cited

U.S. PATENT DOCUMENTS

| | | |
|---|---|---|
| 5,153,881 A | 10/1992 | Bruckert |
| 5,185,877 A | 2/1993 | Bissett |
| 5,694,540 A | 12/1997 | Humelsine |

(Continued)

FOREIGN PATENT DOCUMENTS

| | | |
|---|---|---|
| WO | 2016138953 A1 | 9/2016 |
| WO | 2018162048 A1 | 9/2018 |

OTHER PUBLICATIONS

Yan et al, "Regression From Uncertain Labels and Its Applications to Soft Biometrics", IEEE, pp. 698-708 (Year: 2008).*

(Continued)

*Primary Examiner* — Anil Khatri
(74) *Attorney, Agent, or Firm* — Cantor Colburn LLP; Teddi Maranzano

(57) ABSTRACT

Systems, methods, and computer-readable media are described for associating regression test cases with corresponding test fingerprints via a translation table or other suitable storage mechanism. A test fingerprint indicates a collection of breakpoints encountered as part of traversal of a code path during execution of a test case, and thus, provides an indication of an extent of code coverage of the test case. Test fingerprints can be evaluated to determine cumulative code coverage of sets of test cases. Specific sets of test cases can be selected based on the cumulative code coverage they provide. Sets of test cases that provide greater cumulative code coverage and/or that target specific areas of interest can be prioritized for execution particularly when having to adhere to execution constraints.

17 Claims, 6 Drawing Sheets

(56) References Cited

U.S. PATENT DOCUMENTS

| | | | |
|---|---|---|---|
| 5,758,061 A * | 5/1998 | Plum | G06F 11/3676 714/35 |
| 5,758,062 A | 5/1998 | Mcmahon | |
| 6,718,286 B2 * | 4/2004 | Rivin | G06F 11/3466 702/186 |
| 6,859,922 B1 | 2/2005 | Baker | |
| 7,178,063 B1 | 2/2007 | Smith | |
| 7,315,634 B2 * | 1/2008 | Martin | G06K 9/00093 382/124 |
| 7,552,425 B2 | 6/2009 | Bates et al. | |
| 7,596,778 B2 | 9/2009 | Kolawa | |
| 7,617,074 B2 | 11/2009 | Beish | |
| 7,640,470 B2 * | 12/2009 | Lammel | G06F 11/3676 704/4 |
| 7,640,740 B2 | 1/2010 | Lammel | |
| 7,721,265 B1 | 5/2010 | Xu | |
| 7,945,898 B1 | 5/2011 | Episkopos et al. | |
| 7,958,400 B2 | 6/2011 | Ur | |
| 7,962,798 B2 | 6/2011 | Locasto | |
| 8,296,605 B2 | 10/2012 | John | |
| 8,301,757 B2 | 10/2012 | Catlin | |
| 8,370,816 B2 | 2/2013 | Farchi et al. | |
| 8,479,171 B2 | 7/2013 | Ghosh | |
| 8,527,813 B2 | 9/2013 | Budnik | |
| 8,554,811 B2 * | 10/2013 | Mariani | G06F 11/3409 707/899 |
| 8,649,995 B2 | 2/2014 | Thulasidasan et al. | |
| 8,666,723 B2 * | 3/2014 | Xie | G06F 11/3664 703/14 |
| 8,694,958 B1 * | 4/2014 | Potter | G06F 30/20 717/109 |
| 8,756,460 B2 * | 6/2014 | Blue | G06F 11/3676 714/38.1 |
| 8,775,886 B2 | 7/2014 | Mellen | |
| 8,806,450 B1 | 8/2014 | Maharana | |
| 8,935,673 B1 * | 1/2015 | Ashkenazi | G06F 11/3636 717/125 |
| 8,949,674 B2 | 2/2015 | Mancoridis | |
| 8,954,926 B2 | 2/2015 | Braun et al. | |
| 8,954,930 B2 | 2/2015 | Kamenz | |
| 8,966,453 B1 * | 2/2015 | Zamfir | G06F 11/3604 717/130 |
| 8,997,061 B1 | 3/2015 | Davison | |
| 9,063,899 B2 * | 6/2015 | Epstein | G06F 8/52 |
| 9,098,635 B2 | 8/2015 | Peri-Glass et al. | |
| 9,104,804 B2 * | 8/2015 | Best | G06F 9/45512 |
| 9,111,033 B2 | 8/2015 | Bates | |
| 9,152,540 B2 * | 10/2015 | Xie | G06F 11/3668 |
| 9,202,005 B2 | 12/2015 | Goswami et al. | |
| 9,286,313 B1 | 3/2016 | Sharangpani | |
| 9,336,122 B2 | 5/2016 | Kilzer et al. | |
| 9,454,466 B2 | 9/2016 | Ivrii et al. | |
| 9,489,289 B2 | 11/2016 | Hu | |
| 9,513,998 B2 | 12/2016 | Coronado | |
| 9,529,701 B2 | 12/2016 | Ekambaram et al. | |
| 9,600,241 B2 * | 3/2017 | Shankar | G06F 8/00 |
| 9,600,403 B1 * | 3/2017 | Raz | G06F 11/3684 |
| 9,720,766 B2 | 8/2017 | Lee | |
| 9,734,263 B2 | 8/2017 | Kohavi et al. | |
| 9,779,013 B2 | 10/2017 | Narayan et al. | |
| 9,857,959 B2 | 1/2018 | Dhawal | |
| 9,916,414 B2 | 3/2018 | Jeong | |
| 9,990,272 B2 * | 6/2018 | Cooper | G06F 11/3676 |
| 9,996,452 B2 | 6/2018 | Cooper et al. | |
| 10,061,685 B1 | 8/2018 | White | |
| 10,073,763 B1 * | 9/2018 | Raman | G06F 11/3664 |
| 10,152,479 B1 | 12/2018 | Granstrom | |
| 10,383,553 B1 | 8/2019 | Glenn | |
| 10,430,318 B1 | 10/2019 | Ansari | |
| 10,545,855 B1 * | 1/2020 | Jayaswal | G06F 11/3672 |
| 10,713,151 B1 * | 7/2020 | Zinger | G06F 11/3644 |
| 2003/0233600 A1 | 12/2003 | Hartman | |
| 2004/0154001 A1 | 8/2004 | Haghighat et al. | |
| 2006/0179386 A1 | 8/2006 | Pushpavanam | |
| 2008/0065931 A1 | 3/2008 | Coulter | |
| 2008/0163165 A1 | 7/2008 | Shitrit | |
| 2008/0172652 A1 | 7/2008 | Davia et al. | |
| 2009/0249123 A1 | 10/2009 | Chow | |
| 2010/0023928 A1 | 1/2010 | Hentschel et al. | |
| 2010/0100871 A1 | 4/2010 | Celeskey | |
| 2010/0287534 A1 | 11/2010 | Vangala et al. | |
| 2011/0016457 A1 | 1/2011 | Artzi et al. | |
| 2011/0145653 A1 | 6/2011 | Broadfoot | |
| 2012/0191443 A1 | 7/2012 | Amalfitano | |
| 2012/0253728 A1 | 10/2012 | Chamas | |
| 2012/0260132 A1 | 10/2012 | Blue | |
| 2013/0152047 A1 | 6/2013 | Moorthi | |
| 2014/0013307 A1 | 1/2014 | Hansson | |
| 2014/0059081 A1 | 2/2014 | Farchi et al. | |
| 2014/0095933 A1 | 4/2014 | Griesinger | |
| 2014/0372083 A1 | 12/2014 | Hsu et al. | |
| 2015/0094997 A1 | 4/2015 | Ivrii et al. | |
| 2015/0106653 A1 | 4/2015 | Adler et al. | |
| 2016/0378618 A1 | 12/2016 | Cmielowski et al. | |
| 2017/0060734 A1 | 3/2017 | Raz et al. | |
| 2017/0103013 A1 | 4/2017 | Grechanik | |
| 2017/0132119 A1 | 5/2017 | Xu et al. | |
| 2017/0199810 A1 | 7/2017 | Hamilton | |
| 2017/0262361 A1 | 9/2017 | Francis | |
| 2017/0270035 A1 | 9/2017 | Nie | |
| 2018/0024911 A1 | 1/2018 | Kruszewski et al. | |
| 2018/0052725 A1 | 2/2018 | Hannson | |
| 2018/0095867 A1 | 4/2018 | Varadarajan et al. | |
| 2018/0293156 A1 | 10/2018 | Zeng | |
| 2018/0300226 A1 | 10/2018 | Manolios | |
| 2018/0329807 A1 | 11/2018 | Atyam | |
| 2019/0332523 A1 | 10/2019 | Gefen | |
| 2020/0242011 A1 | 7/2020 | Hicks | |
| 2020/0242012 A1 | 7/2020 | Hicks | |
| 2020/0242013 A1 | 7/2020 | Hicks | |

OTHER PUBLICATIONS

Trokielewicz, "Linear Regression Analysis of Template Aging in Iris Biometrics", IEEE, pp. 1-6 (Year: 2015).*

Bromme et al, "A Conceptual Framework for Testing Biometric Algorithms within Operating Systems' Authentication", ACM, pp. 273-280 (Year: 2002).*

Giugno et al, "GraphGrep: A Fast and Universal Method for Querying Graphs", IEEE, pp. 112-115 (Year: 2002).*

Andalib et al, "A Novel Key Generation Scheme for Biometric Cryptosystems Using Fingerprint Minutiae", IEEE, pp. 1-6 (Year: 2013).*

Gu et al, "Multi-Aspect, Robust, and Memory Exclusive Guest OS Fingerprinting", IEEE, pp. 380-394 (Year: 2014).*

Biswas, "Network-on-Chip Intellectual Property Protection Using Circular Path-based Fingerprinting", ACM, pp. 1-22 (Year: 2020).*

Fang et al, "Identifying Test Refactoring Candidates with Assertion Fingerprints", ACM, pp. 125-137 (Year: 2015).*

Anonymous, "A Method and System for Providing Collaborative Platform as a Service for Aiding Machine Learning Development," IP.com (IPCOM000256095D). Nov. 2, 2018. 5 pages.

Anonymous, "Black Hole Testing—Machine Learning Program Behavior Patterns from Massive Automated Test Results," IP.com (IPCOM000243987D). Nov. 4, 2015. 8 pages.

Anonymously Disclosed "A system and method for setting breakpoints automatically by comparing correct and incorrect runs" IP.com No. IPCOM000252399D, Publication Date: Jan. 8, 2018, 5 pages.

Anonymously Disclosed "Advanced Interrogative Debugger for data-centric domain", IP.com No. IPCOM000226865D, Publication Date: Apr. 23, 2013, 14 pages.

Anonymously Disclosed "Cognitive, Self-Instrumenting Code on Detection of an Issue" IP.com No. IPCOM000253277D; Publication Date: Mar. 19, 2018; 4 pgs.

Anonymously Disclosed "Method and system to find potential program defect based on run-time variable change analysis", IP.com No. IPCOM000248699D, Publication Date: Dec. 28, 2016, 8 pages.

(56) References Cited

OTHER PUBLICATIONS

Anonymously Disclosed "Method for a debugging tool for finding variable value in application stack", IP.com No. IPCOM000209789D, Publication Date: Aug. 15, 2011, 5 pages.
Anonymously Disclosed "Method to enable debugger breakpoint inside statement", IP.com No. IPCOM000206941D, Publication Date: May 13, 2011, 8 pages.
Anonymously Disclosed "Simple Automated Code Coverage Method for test metrics", IP.com No. IPCOM000201864D, Publication Date: Nov. 29, 2010, 6 pages.
Anonymously Disclosed "Structured enhanced breakpoint chain", IP.com No. IPCOM000244264D, Publication Date: Nov. 27, 2015, 4 pages.
Anonymously Disclosed "System and method for improved regression failure analysis and easier debugging of test failures", IP.com No. IPCOM000209599D, Publication Date: Aug. 10, 2011, 6 pages.
Astigarraga, Tara "IBM Test Overview and Best Practices", IBM, Nov. 2012, pp. 1-53.
Cohen, D. M. et al., "The AETG system: An approach to testing based on combinatorial design." IEEE Transactions on Software Engineering, 23(7), pp. 437-444. Jul. 1997.
Compuware Corporation "Validate Testing Thoroughness and Provide Application Analysis", 2014, 4 pages.
De Souza et al., "Spectrum-based Software Fault Localization: A Survey of Techniques, Advances and Challenges" Dept. of Computer Science—University of Sao Paulo; arXiv:1607.04347v2 [cs.SE]; Nov. 26, 2017, 46 pages.
Devai, Gergely et al., "UML Model Execution via Code Generation" Eotvos Lorand University, Faculty of Informatics, Budapest, Hungary 2017, pp. 9-15.
Hicks et al., "Champion Test Case Generation", U.S. Appl. No. 16/256,949, filed Jan. 24, 2019.
Hicks et al., "Combinatoric Set Completion Through Unique Test Case Generation", U.S. Appl. No. 16/256,394, filed Jan. 24, 2019.
Hicks et al., "Fault Detection and Localization Using Combinatorial Test Design Techniques While Adhering to Archtiectural", U.S. Appl. No. 16/256,391, filed Jan. 24, 2019.
Hicks et al., "Reduction of Test Infrastructure", U.S. Appl. No. 16/440,781, filed Jun. 13, 2019.
Hicks et al., "Self Healing Software Utilizing Regression Test Fingerprints", U.S. Appl. No. 16/440,833, filed Jun. 13, 2019.
Hicks et al., "Test Space Analysis Across Multiple Combinatoric Models", U.S. Appl. No. 16/256,388, filed Jan. 24, 2019.
Hicks et al., "Fault Detection and Localization to Generate Failing Test Cases Using Combinatorial Test Design Techniques", U.S. Appl. No. 16/256,388, filed Jan. 24, 2019.
Hicks et al., "Breakpoint Value-Based Version Control," U.S. Appl. No. 16/440,800, filed Jun. 13, 2019.
Hicks et al., "Customizable Test Set Selection Using Code Flow Trees," U.S. Appl. No. 16/440,751, filed Jun. 13, 2019.
Hicks et al., "Fault Detection Using Breakpoint Value-Based Fingerprints of Failing Regression Test Cases," U.S. Appl. No. 16/440,810, filed Jun. 13, 2019.
Hicks et al., "Regression Test Fingerprints Based on Breakpoint Values," U.S. Appl. No. 16/440,404, filed Jun. 13, 2019.
IBM "Assuring Software Quality by Automatic Generation of Test Cases and Automatic Analysis of Test Case Results for Derivation and Regression Error Determination" IP.com No. IPCOM000180300D; Publication Date: Mar. 6, 2009; 6 pgs.
IBM, "InspectioN Testing Using Debugging Capabilities To Allow Combinational Testing", IP.com No. IPCOM000188370D, Electronic Publication Date: Oct. 2, 2009, 3 pages.
IBM, "Tool and Strategy for testing and validating software components at the source code level", IP.com No. IPCOM000180330D, Publication Date: Mar. 6, 2009, 3 pages.
IBM, Method of preventing build failures by searching through levels in a multi-level revision control system IP.com No. IPCOM000179779D, Publication Date: Feb. 25, 2009, 3 pages.
Koch, Gernot et al., "Breakpoints and Breakpoint Detection in Source Level Emulation", Forschungszentrum Informatik (FZI), Haid-und-Neu-Strabe 10-14, D 76131 Karlsruhe, DE; University of Tübingen, Sand 13, D 72076 Tübingen, DE, 2017, 6 pages.
Kuhn, Rick "Introduction to Combinatorial Testing", NIST, Carnegie-Mellon University, Jun. 7, 2011, 48 pages.
Leon et al., "An empirical evaluation of test case filtering techniques based on exercising complex information flows," Proceedings of the 27th International Conference on Software Engineering, pp. 412-421. ACM, 2005.
Kamalakar, Sunil, "Automatically Generating Tests from Natural Language Descriptions of Software Behavior," Virginia Polytechic Institute and State University, Sep. 23, 2013. 72 pages.
List of IBM Patents or Patent Applications Treated as Related; Date Filed: Jul. 19, 2019, 2 pages.
Mathur et al., "Adaptive Automation: Leveraging Machine Learning to Support Uninterrupted Automated Testing of Software Applications" arXiv.org, Aug. 4, 2015. 6 pages.
Nguyen et al., "Combining model-based and combinatorial testing for effective test case generation," Proceedings of the 2012 International Symposium on Software Testing and Analysis, Jul. 15-20, 2012. pp. 100-110.
Petke, J. et al., "Efficiency and early fault detection with lower and higher strength combinatorial interaction testing". In Proceedings of the 2013 9th Joint Meeting on Foundations of Software Engineering, pp. 26-36. Aug. 18-26, 2013.
Segall "Combinatorial Test Design" IBM Haifa Research Labs, 2012, pp. 1-49.
Shakya, K. & Xie, T., "Isolating Failure-Inducing Combinations in Combinatorial Testing using Test Augmentation and Classification", CT 2012 workshop, (23 pages).
Soffa, Mary Lou et al. Exploiting Hardware Advances for Software Testing and Debugging (NIER Track) ICSE '11; May 21-28, 2011; 4 pgs.
Yilmaz et al., "Moving forward with combinatorial interaction testing," Computer, 47(2). Feb. 2014. pp. 37-45.
Willmor, David, and Suzanne M. Embury. "A safe regression test selection technique for database-driven applications." 21st IEEE International Conference on Software Maintenance (ICSM'05). IEEE, 2005.pp. 1-10 (Year: 2005).
"All pair testing" wikipedia page from dated Sep. 14, 2017, retrieved using the WayBackMachine, from https://web.archive.org/web/20170914145543/https://en.wikipedia.org/wiki/All-pairs_testing (Year: 2017).
"CPC Cooperative Patent Classification, G06F Electrical Digital DAT Processing" of Apr. 2015, retrieved from https://www.cooperativepatentclassification.org/cpc/ (Year: 2015).
Orso, Alessandro, Nanjuan Shi, and Mary Jean Harrold. "Scaling regression testing to large software systems." ACM SIGSOFT Software Engineering Notes 29.6 (2004): pp. 241-251. (Year: 2004).
Rothermel et al., "Analyzing Regression Test Selection Techniques", IEEE, pp. 529-551 (Year: 1996).
Wikipedia "Cartesian Product" web page, from date Jan. 15, 2019, retrieved from https://web.archive.org/web/20190115231627/https://en.wikipedia.org/wiki/Cartesian_product (Year: 2019).
Yi, Qiuping, et al. "A synergistic analysis method for explaining failed regression tests." 2015 IEEE/ACM 37th IEEE International Conference on Software Engineering. vol. 1. IEEE, 2015.pp. 257-267 (Year: 2015).
Yimaz et al., "Moving forward with combinatorial interaction testing", Feb. 2014, 47(2), pp. 37-45.
Anderson et al., "Customized Regression Testing Using Telemetry Usage Patterns," 2016 IEEE International Conference on Software Maintenance and Evolution; pp. 572-581 (10 pages).

* cited by examiner

ASSOCIATING ATTRIBUTE SEEDS OF REGRESSION TEST CASES WITH BREAKPOINT VALUE-BASED FINGERPRINTS

RELATED APPLICATIONS

This application which claims the benefits of multiple legally related applications including Application titled "FAULT DETECTION AND LOCALIZATION TO GENERATE FAILING TEST CASES USING COMBINATORIAL TEST DESIGN TECHNIQUES" assigned Ser. No. 16/256,388, filed Jan. 24, 2019; Application titled "FAULT DETECTION AND LOCALIZATION USING COMBINATORIAL TEST DESIGN TECHNIQUES WHILE ADHERING TO ARCHITECTURAL RESTRICTIONS" assigned Ser. No. 16/256,391, filed Jan. 24, 2019; Application titled "COMBINATORIC SET COMPLETION THROUGH UNIQUE TEST CASE GENERATION" assigned Ser. No. 16/256,394, filed Jan. 24, 2019; Application titled "TEST SPACE ANALYSIS ACROSS MULTIPLE COMBINATORIC MODELS" assigned Ser. No. 16/256,179, filed Jan. 24, 2019; Application titled "CHAMPION TESTCASE GENERATION" assigned Ser. No. 16/256,949, filed Jan. 24, 2019; Application titled "REGRESSION TEST FINGERPRINTS BASED ON BREAKPOINT VALUES," assigned Ser. No. 16/440,404, filed Jun. 13, 2019; Application titled "SELF HEALING SOFTWARE UTILIZING REGRESSION TEST FINGERPRINTS," not yet filed; Application titled "REDUCTION OF TEST INFRASTRUCTURE," not yet filed; Application titled "BREAKPOINT VALUE-BASED VERSION CONTROL," not yet filed; Application titled "FAULT DETECTION USING BREAKPOINT VALUE-BASED FINGERPRINTS OF FAILING REGRESSION TEST CASES," not yet filed; and Application titled "CUSTOMIZABLE TEST SET SELECTION USING CODE FLOW TREES," not yet filed, with all the benefits accruing therefrom, the contents of which in its entirety are herein incorporated by reference.

BACKGROUND

The present invention relates generally to regression testing, and more particularly, to generating, populating, and utilizing a translation table or other suitable storage mechanism that associates attribute seeds of regression tests with breakpoint value-based fingerprints of the regression tests.

Breakpoints are intentional stopping or pausing points in a program, typically inserted for the purposes of debugging. More generally, a breakpoint is a means of acquiring knowledge about a program's execution. When a breakpoint is reached during execution, a test environment (e.g., general purpose registers, memory, logs, files, etc.) to attempt to determine whether the program is functioning as expected. Breakpoints are commonly used to interrupt a running program immediately before execution of particular program instructions, in which case, they may be referred to as instruction breakpoints.

Combinatorial Test Design (CTD) is a testing methodology that seeks to increase test space coverage for a System Under Test (SUT) through the use of automated algorithms. These algorithms identify input patterns that are most likely to locate problems in the SUT, thereby reducing the amount of time required for a tester to build test cases and an automation framework. CTD is well-adapted for projects that require numerous variations on static input vectors to properly test various system states and logic pathways, which would otherwise be extremely cumbersome for a human tester.

CTD provides enhanced testing efficiency over manual testing through the use of automated algorithms. CTD methodologies, however, still suffer from a number of technical drawbacks, technical solutions to which are described herein.

SUMMARY

In one or more example embodiments, a method for associating a particular test case with a particular test fingerprint indicative of code coverage of the particular test case is disclosed. The method includes executing the particular test case. During execution of the particular test, a code path traversed during execution is determined and a collection of breakpoints encountered during traversal of the code path is determined. The method further includes determining the particular test fingerprint corresponding to the particular test case based at least in part on the collection of breakpoints, determining an attribute seed associated with the particular test case, and storing an association between the attribute seed and the particular test fingerprint.

In one or more other example embodiments, a system for associating a particular test case with a particular test fingerprint indicative of code coverage of the particular test case is disclosed. The system includes at least one memory storing computer-executable instructions and at least one processor configured to access the at least one memory and execute the computer-executable instructions to perform a set of operations. The operations include executing the particular test case. During execution of the particular test, a code path traversed during execution is determined and a collection of breakpoints encountered during traversal of the code path is determined. The operations further include determining the particular test fingerprint corresponding to the particular test case based at least in part on the collection of breakpoints, determining an attribute seed associated with the particular test case, and storing an association between the attribute seed and the particular test fingerprint.

In one or more other example embodiments, a computer program product for associating a particular test case with a particular test fingerprint indicative of code coverage of the particular test case is disclosed. The computer program product includes a computer readable storage medium having program instructions embodied therewith. The program instructions are executable by a processing circuit to cause the processing circuit to perform a method. The method includes executing the particular test case. During execution of the particular test, a code path traversed during execution is determined and a collection of breakpoints encountered during traversal of the code path is determined. The method further includes determining the particular test fingerprint corresponding to the particular test case based at least in part on the collection of breakpoints, determining an attribute seed associated with the particular test case, and storing an association between the attribute seed and the particular test fingerprint.

BRIEF DESCRIPTION OF THE DRAWINGS

The detailed description is set forth with reference to the accompanying drawings. The drawings are provided for purposes of illustration only and merely depict example embodiments of the invention. The drawings are provided to facilitate understanding of the invention and shall not be deemed to limit the breadth, scope, or applicability of the invention. In the drawings, the left-most digit(s) of a reference numeral identifies the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Figure 1:
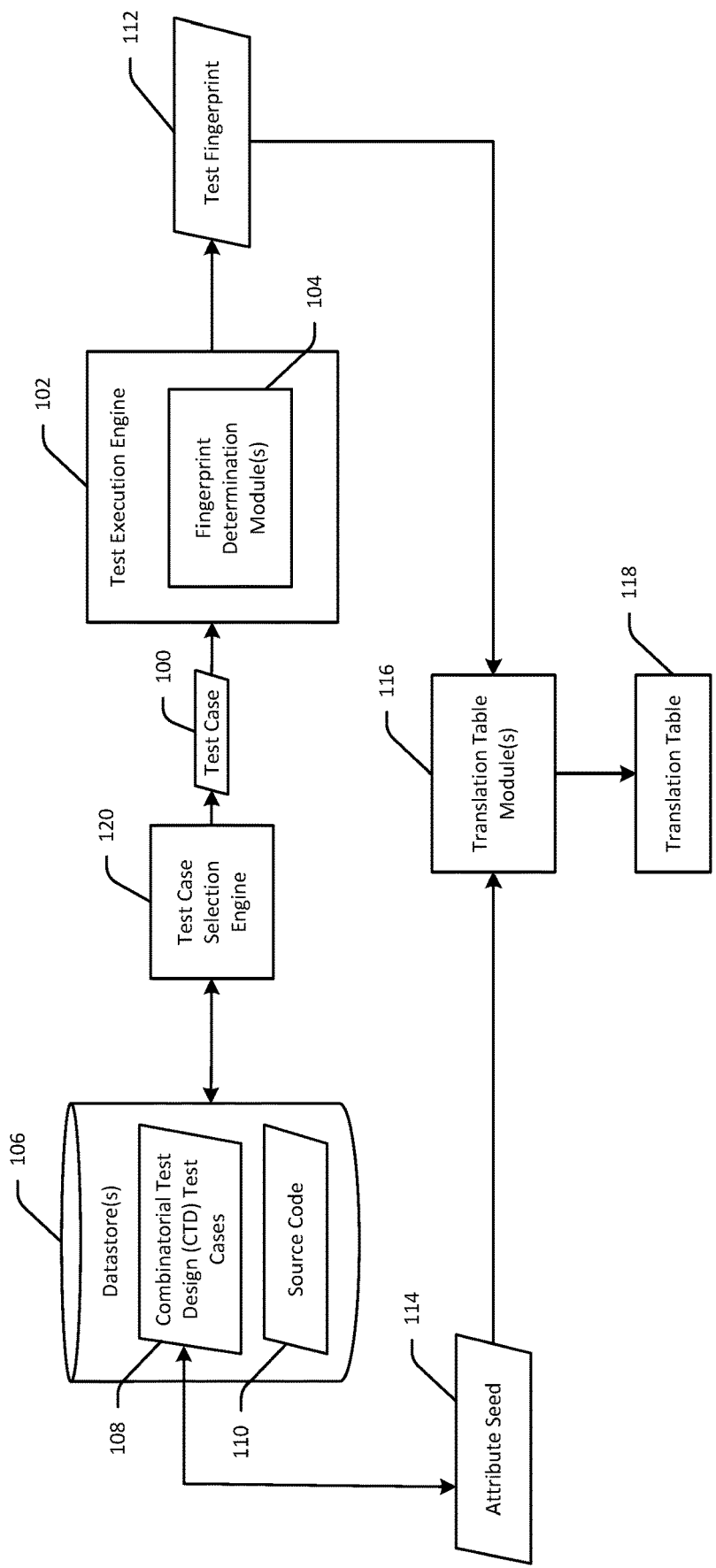
FIG. 1 is a schematic hybrid data flow/block diagram illustrating storing associations between test cases and their corresponding breakpoint value-based test fingerprints via a translation table in accordance with one or more example embodiments of the invention.

Example embodiments of the invention relate to, among other things, devices, systems, methods, computer-readable media, techniques, and methodologies for associating regression test cases with corresponding test fingerprints via a translation table. The regression test cases may be executed with respect to a System Under Test (SUT). While example embodiments may be described herein with respect to SUTs that are software systems such as a body of source code, it should be appreciated that the SUT may be a hardware system or a collection of hardware logic as well. Further, certain terminology used herein to describe a collection of elements, a type of data structure, or the like are not intended to be limiting in any way and are intended to encompass any variation or alternative that achieves the same function. For instance, reference made herein to a test vector or some variation thereof is not intended to limit embodiments of the invention to any particular type of data structure for representing a test vector. The combination of attribute-value pairs represented by a test vector can be stored/represented using any suitable type of data structure. As another example, the terms set, group, collection, and the like are used interchangeably herein to connote any collection of elements that may or may not be ordered. In addition, while example embodiments may be described herein in connection with a translation table for storing associations between attribute seeds of test cases and corresponding test fingerprints, it should be appreciated that the translation table may be a database, repository, or any other organized storage area.

In example embodiments, a test case may be executed and a code path traversed during execution may be determined. A collection of breakpoints encountered during traversal of the code path may then be determined and a test fingerprint indicative of code coverage of the test case may be generated based on the collection of breakpoints encountered. A translation table may then be populated with an entry that associates the test case with its corresponding test fingerprint. In example embodiments, the translation table entry may store an attribute seed of the test case in association with the test fingerprint. The attribute seed may be a representation of the combination of attribute-value pairs tested by the test case. In particular, inputs to a SUT such as a body of source code can be modeled as a collection of attributes, each of which is capable of taking on a respective one or more attribute values. CTD techniques may be employed to generate CTD test vectors, where each CTD test vector is representative of a particular combination of attribute-value pairs. A corresponding test case may be generated for each such CTD vector that tests the particular combination of attribute-value pairs embodied by the CTD vector.

Breakpoints are points in the execution of source code that occur before or after one or more lines of source code and that can halt execution of the program or trigger specific tools. In example embodiments, as a test case is executed, a code path may be traversed through a body of source code being tested, potentially resulting in multiple breakpoints being encountered, one or more of which may be encountered multiple times. As used herein, a code path may refer to a path traversed during execution of at least a portion of source code and may indicate a number of times each breakpoint is encountered, and potentially, an order in which such breakpoints are encountered during execution.

In example embodiments, a test fingerprint may be generated that is indicative of each breakpoint encountered as part of traversal of a code path during execution of a test case. The test fingerprint may be further indicative of a number of times each such breakpoint is encountered as well as, potentially, an order in which the breakpoint encounters occur. Various algorithms may be employed to generate a test fingerprint for a test case based on breakpoints encountered during execution of the test case. Such algorithms are described in co-pending application entitled "Regression Test Fingerprints Based on Breakpoint Values."

Regardless of the particular algorithm employed to generate a test fingerprint, the fingerprint may be reversible to ascertain which breakpoints were encountered during execution of the test case to which the fingerprint corresponds and a respective number of times each such breakpoint was encountered. Further, in example embodiments, certain fingerprint generation algorithms may generate a test fingerprint that is reversible to further determine an order in which the breakpoint encounters occurred. More specifically, in example embodiments, a test fingerprint may be a data structure that is indexed with respect to the breakpoints present in a SUT. For instance, each element of a test fingerprint may correspond to a particular breakpoint. In example embodiments, a value greater than zero at a particular indexed location in the test fingerprint may indicate that the breakpoint that corresponds to that indexed location was encountered during execution of the corresponding test case. Further, in example embodiments, any given value in a test fingerprint may be broken down into constituent breakpoint values that may be indicative of a number of times a corresponding breakpoint was encountered, and potentially, an order in which the breakpoint was encountered.

In any case, in example embodiments, the test fingerprint that is generated based on the collection of breakpoints encountered during a code path traversal associated with execution of a test case may be indicative of an extent of code coverage associated with the test case. As used herein, the term code coverage refers to the portion of a SUT (e.g., a body of source code) that is tested by a test case in relation to the entire SUT (e.g., the entire body of source code). In example embodiments, a test fingerprint may reveal which breakpoints are encountered during execution of a test case, and thus, the extent of code coverage provided by the test case.

In example embodiments, a translation table that maps test cases to their corresponding breakpoint value-based test fingerprints can be used to achieve desired code coverage metrics during regression testing. For instance, if a certain amount of cumulative code coverage is desired for a regression bucket of test cases, the translation table can be accessed to identify a respective test fingerprint corresponding to each test case (based on the stored associations between the attribute seeds of test cases and the test fingerprints), and the test fingerprints can be evaluated to determine how many breakpoints were encountered during execution of each test case, and thus, a respective code coverage of each test case. A subset of test cases can then be selected that provides a cumulative code coverage that is at least as great as the desired cumulative code coverage. The cumulative code coverage associated with a set of test cases may be determined, for example, based on the total number of unique breakpoints encountered during execution of the set of test cases, as determined from the respective collection of breakpoints embodied in each test fingerprint.

In certain example embodiments, the subset of test cases to execute may be selected so as to satisfy one or more constraints. For instance, in example embodiments, the subset of test cases may be selected such that all test cases can be executed within a time constraint (e.g., a threshold period of time). As another non-limiting example, a maximum number of test cases may be specified. In such example embodiments in which one or more constraints are applicable, the subset of test cases selected may be that subset which satisfies the constraint(s) and which provides the most extensive cumulative code coverage (as determined from corresponding test fingerprints accessible via the translation table) as compared to each other candidate subset of test cases that satisfies the constraint(s).

In addition, in example embodiments, code coverage ascertained from test fingerprints accessible via the translation table may be used to determine which set of regression test cases to execute, where each set of test cases provides a desired amount of coverage of a test space. For instance, if an entire test space is modeled as the Cartesian product of all possible attribute-value pair combinations, it may be desirable to perform a reduction of the entire test space to obtain a reduced set of CTD vectors that provides a desired complete n-wise coverage of the test space but not complete coverage. As a non-limiting example, an entire test space can be reduced down to a set of CTD vectors that provides complete pairwise coverage of the test space but only partial higher-order coverage. As used herein, if a set of CTD vectors/test cases is referred to as providing complete n-wise coverage, this indicates that the set, in the aggregate, includes all possible n-way combinations of attribute values.

Often, there are multiple unique reduced sets of CTD vectors (and thus sets of corresponding test cases) that each provide complete n-wise coverage of a test space. In example embodiments, the cumulative code coverage for each of the multiple unique reduced sets of test cases—as determined from corresponding test fingerprints accessible via the translation table—can be evaluated to determine which reduced set of test cases to select for execution. For instance, in example embodiments, a respective attribute seed may be determined for each test case in a first reduced set of test cases and each test case in a second reduced set of test cases, where each of the first reduced set and the second reduced set provide complete n-wise (e.g., pairwise) coverage of a test space. The attribute seeds may be used to search a translation table for correspondingly stored test fingerprints. Each retrieved test fingerprint may be deconstructed to obtain the corresponding collection of breakpoints encountered during execution of a corresponding test case. From these collections of breakpoints, a cumulative code coverage associated with the first reduced set of test cases and a cumulative code coverage associated with the second reduced set of test cases may be determined. The reduced set of test cases associated with the more extensive cumulative code coverage may then be selected for execution in lieu of the other reduced set of test cases, or in the alternative, prioritized for execution over the other reduced set of test cases, particularly in those example scenarios involving constraint(s) on the execution of test cases.

Example embodiments of the invention also contemplate other uses for a translation table as described herein. In particular, storing associations between attribute seeds of test cases and corresponding test fingerprints provides not only a means for recording the scope of code coverage for a given test case, but also a mechanism for mapping test cases to specific areas of code and/or specific code modules covered by the test cases. Thus, in example embodiments, if a function of a SUT (e.g., a routine in a body of source code) is changed, specialized test cases targeted to the area of interest can be selected and/or regenerated as needed based on an identification of which test cases correspond to test fingerprints that identify breakpoints associated with the area of interest, thereby enabling creation of a more effective regression test suite. In example embodiments in which one hundred percent code coverage is not sought to be achieved, such specialized test cases that target specific areas of interest in a SUT may be prioritized for execution.

Example embodiments of the invention provide various technical effects over conventional regression testing methodologies. In particular, example embodiments of the invention provide a mechanism for mapping test cases to test fingerprints indicative of the extent of code coverage of the test cases. This mechanism yields the technical effect of enabling test cases to be generated or selected based on the extent of their code coverage, and thereby enables more efficient and more targeted regression testing to be performed, thus representing an improvement to computer-based regression testing technology. In example embodiments, the test fingerprints to which test cases are mapped are reversible to identify specific breakpoints encountered on traversals of code paths during execution of the test cases. The breakpoints are linked to specific areas of a SUT such as specific lines of code in a body of source code. Thus, example embodiments of the invention also provide a mechanism for mapping test cases to specific areas and modules in a SUT, which yields the technical effect of enabling selection and/or generation of specialized test cases that target specific areas of interest in a SUT (e.g., a module or function that has been changed) based on a determination that the corresponding test fingerprint is indicative of breakpoints associated with the areas of interest. This technical effect is a further improvement to computer-based regression testing technology. The above-mentioned technical effects are achieved at least in part by various technical features of example embodiments of the invention including, without limitation, determination of a code path traversed during execution of a test case; determination of a collection of breakpoints encountered during traversal of the code path; generation of a test fingerprint based on the collection of breakpoints encountered; and storage of the test fingerprint or some other identifier thereof in association with an attribute seed of the corresponding test case.

Illustrative methods in accordance with example embodiments of the invention and corresponding data structures (e.g., program modules, engines, etc.) for performing the methods will now be described. It should be noted that each operation of any of the methods 300-500 respectively depicted in FIGS. 3-5 may be performed by one or more of the program modules or the like depicted in FIG. 1 or FIG. 6, whose operation will be described in more detail hereinafter. These program modules may be implemented in any combination of hardware, software, and/or firmware. In certain example embodiments, one or more of these program modules may be implemented, at least in part, as software and/or firmware modules that include computer-executable instructions that when executed by a processing circuit cause one or more operations to be performed. A system or device described herein as being configured to implement example embodiments may include one or more processing circuits, each of which may include one or more processing units or nodes. Computer-executable instructions may include computer-executable program code that when executed by a processing unit may cause input data contained in or referenced by the computer-executable program code to be accessed and processed to yield output data.

Figure 3:
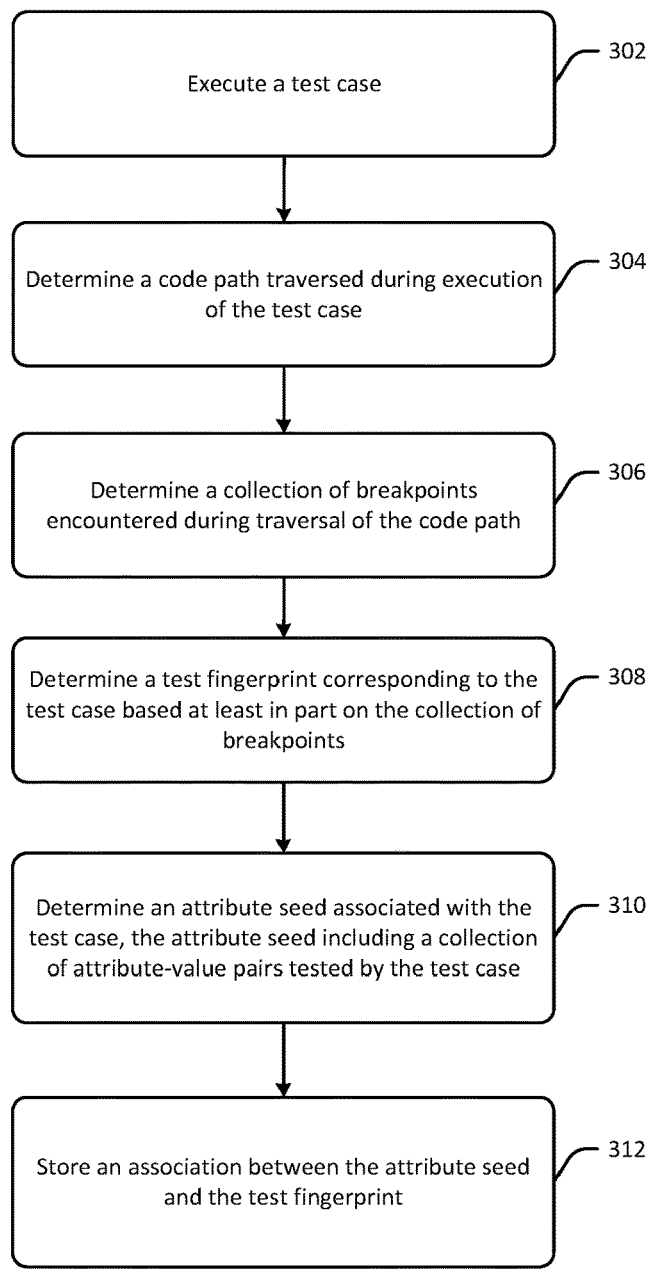
FIG. 3 is a process flow diagram of an illustrative method for associating a test case with a test fingerprint indicative of code coverage of the test case in accordance with one or more example embodiments of the invention.

FIG. 1 is a schematic hybrid data flow/block diagram illustrating associating test cases with their corresponding breakpoint value-based test fingerprints via a translation table in accordance with one or more example embodiments of the invention. FIG. 3 is a process flow diagram of an illustrative method 300 for associating a test case with a test fingerprint indicative of code coverage of the test case in accordance with one or more example embodiments of the invention. FIG. 3 will be described in conjunction with FIG. 1 hereinafter.

Referring first to FIG. 3, at block 302 of the method 300, a test case 100 may be executed by a test execution engine 102. In example embodiments, computer-executable instructions of a test case selection engine 120 may be executed to select the test case 100 from a set of CTD test cases 108 stored in one or more datastore(s) 106. The selected test case 100 may then be provided to the test execution engine 102 for execution. Each CTD test case may have been generated from a corresponding CTD test vector representative of a particular combination of attribute-value pairs to be tested on a SUT such as a body of source code 110. In certain example embodiments, the set of CTD test cases 108 may provide complete coverage of an entire test space, that is, all possible combinations of attribute values. Generally, however, it is infeasible to execute within any reasonable constraint (e.g., time constraint) the total number of CTD test cases required to provide complete coverage of an entire Cartesian product test space. Thus, in example embodiments, the set of CTD test cases 108 may include reduced set(s) of test cases that provide complete n-wise coverage of a test space but only partial higher-order coverage.

In example embodiments, at block 304 of the method 300, computer-executable instructions of one or more fingerprint determination modules 104 of the test execution engine 102 may be executed to determine a code path traversed during execution of the test case 100. Then, at block 306 of the method 300, the fingerprint determination module(s) 104 may be executed to determine a collection of breakpoints encountered during traversal of the code path. At block 308 of the method 300, computer-executable instructions of the fingerprint determination module(s) 104 may be executed to determine a test fingerprint 112 corresponding to the executed test case 100 based on the collection of breakpoints encountered during traversal of the code path.

In example embodiments, traversal of a code path through a body of source code being tested by a test case is likely to result in encountering multiple breakpoints, one or more of which may be encountered multiple times. In example embodiments, the test fingerprint 112 generated at block 308 is indicative of each breakpoint encountered and a number of times each such breakpoint is encountered as part of traversal of a code path during execution of the selected test case 100. The test fingerprint 112 may be potentially further indicative of an order in which the breakpoint encounters occur. Any of the algorithms previously referenced may be employed to generate the test fingerprint 112.

Regardless, however, of the particular algorithm employed to generate the test fingerprint 112, the fingerprint 112 may be reversible to ascertain which breakpoints were encountered during execution of the test case 100 to which the fingerprint 112 corresponds and a respective number of times each such breakpoint was encountered. Moreover, in example embodiments, certain fingerprint generation algorithms may generate a test fingerprint that is reversible to further determine an order in which the breakpoint encounters occurred. In any case, in example embodiments, the test fingerprint 112 that is generated at block 308 based on the collection of breakpoints encountered during a code path traversal associated with execution of the selected test case 100 may be indicative of an extent of code coverage associated with the test case. In particular, in example embodiments, a test fingerprint may reveal which breakpoints are encountered during execution of a test case, and thus, the extent of code coverage provided by the test case.

Referring again to FIG. 3, at block 310 of the method 300, an attribute seed 114 associated with the test case 100 may be determined. The attribute seed 114 may be a representation of the combination of attribute-value pairs tested by the test case 100. More specifically, the attribute seed 114 may be a Javascript Object Notation (JSON) mapping of attributes to particular attribute values or any other suitable representation of a particular combination of attribute values. At block 312 of the method 300, computer-executable instructions of one or more translation table modules 116 may be executed to store an association between the attribute seed 114 and the test fingerprint 112. In example embodiments, a translation table 118 may be populated with an entry that associates the test case 100 with its corresponding test fingerprint 112, or more specifically, that associates the attribute seed 114 of the test case 100 with the test fingerprint 112.

Figure 2:
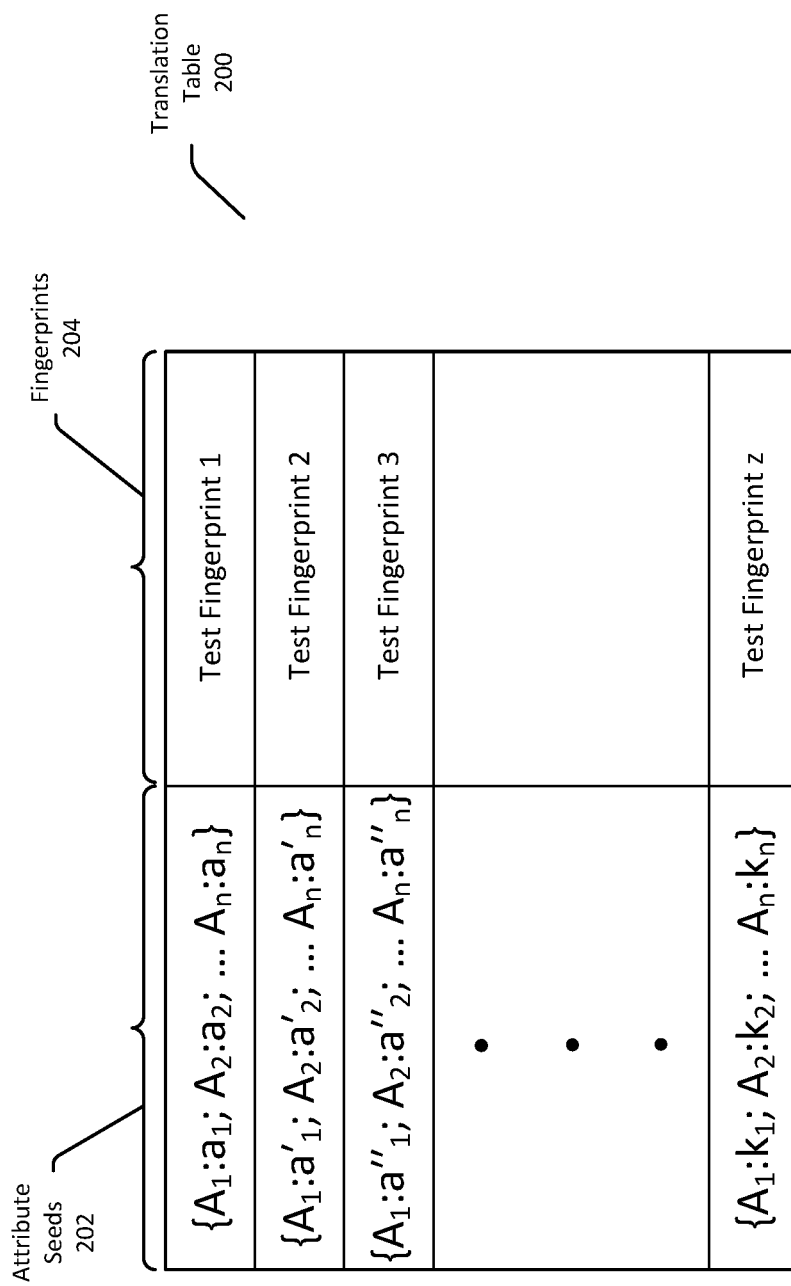
FIG. 2 is a schematic depiction of entries in an example translation table in accordance with one or more example embodiments of the invention.

FIG. 2 is a schematic depiction of entries in an example translation table 200 in accordance with one or more example embodiments of the invention. The example translation table 200 is depicted as including multiple entries that respectively store attribute seeds 202 of test cases in association with corresponding test fingerprints 204 of the test cases. In particular, each translation table entry associates an attribute seed of a particular test case with a corresponding test fingerprint of that test case. As previously noted, each attribute seed represents a particular combination of attribute values tested by a corresponding test case. Each attribute seed is stored in the translation table 200 in association with a test fingerprint that is indicative of an extent of code coverage associated with execution of the test case corresponding to the attribute seed.

Figure 4:
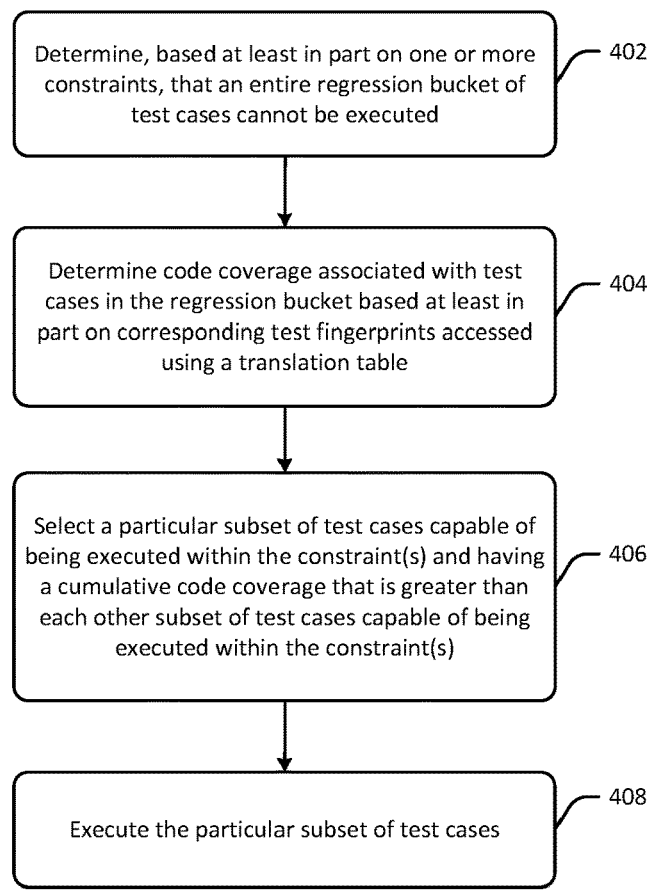
FIG. 4 is a process flow diagram of an illustrative method for identifying and executing a subset of test cases that satisfies constraint(s) and that has a greatest cumulative code coverage among candidate subsets of test cases that satisfy the constraint(s) in accordance with one or more example embodiments of the invention.

In example embodiments, a translation table that maps test cases to their corresponding breakpoint value-based test fingerprints such as the example translation table 200 can be used to achieve desired code coverage metrics during regression testing. FIG. 4 depicts an example method 400 for utilizing the information contained in a translation table that associates attribute seeds of test cases with corresponding test fingerprints to achieve desired code coverage metrics. In particular, FIG. 4 is a process flow diagram of an illustrative method 400 for identifying and executing a subset of test cases that satisfies constraint(s) and that has a greatest cumulative code coverage among candidate subsets of test cases that satisfy the constraint(s) in accordance with one or more example embodiments of the invention.

At block 402 of the method 400, computer-executable instructions of the test selection engine 120 may be executed to determine, based on one or more constraints, that an entire regression bucket of test cases cannot be executed within the constraint(s). Example constraints include, without limitation, a time constraint specifying that regression testing must be performed within a threshold period of time; a size constraint that specifies an upper threshold on the number of regression tests that can be executed; and so forth. Thus, in example embodiments, determining that a regression bucket of test cases cannot be executed within constraint(s) may include determining that the entire set of test cases cannot be executed within a threshold period of time and/or that the regression bucket includes more than a threshold number of test cases eligible for execution.

At block 404 of the method 400, computer-executable instructions of the test selection engine 120 may be executed to determine code coverage associated with the test cases in the regression bucket (e.g., at least some of the test cases 108) based on corresponding test fingerprints accessed via the translation table 118. In particular, attribute seeds of the test cases in the regression bucket may be used to locate corresponding test fingerprints stored in the translation table 118 in association with the attribute seeds. The test fingerprints can be evaluated to determine how many breakpoints were encountered during execution of each test case, and thus, a respective code coverage of each test case.

At block 406 of the method 400, computer-executable instructions of the test case selection engine 120 may be executed to select a particular subset of test cases capable of being executed with the constraint(s) and having a cumulative code coverage that is greater than each other subset of test cases capable of being executed within the constraint(s). For instance, in example embodiments, the corresponding test fingerprints of each subset of test cases capable of being executed within the constraint(s) may be evaluated to determine the cumulative code coverage of each such subset. Then, at block 406, the particular subset that provides the largest code coverage may be selected. Finally, at block 408 of the method 400, the selected subset of test cases may be executed within the specified constraint(s).

In certain example embodiments, a threshold amount of cumulative code coverage may be desired. In such example embodiments, a subset of test cases may be selected that provides a cumulative code coverage that is at least as great as the desired cumulative code coverage. In this manner, the desired threshold amount of cumulative code coverage may operate as a constraint. In those example embodiments in which other constraints are present such as a time constraint, the particular subset of test cases selected for execution may provide at least the desired threshold amount of code coverage while still being capable of completing execution within the time constraint, but may not necessarily provide the largest cumulative code coverage among all subsets capable of being executed within the time constraint. This may be the case if specific areas of interest (e.g., specific portions of the source code 110) are being targeted.

Figure 5:
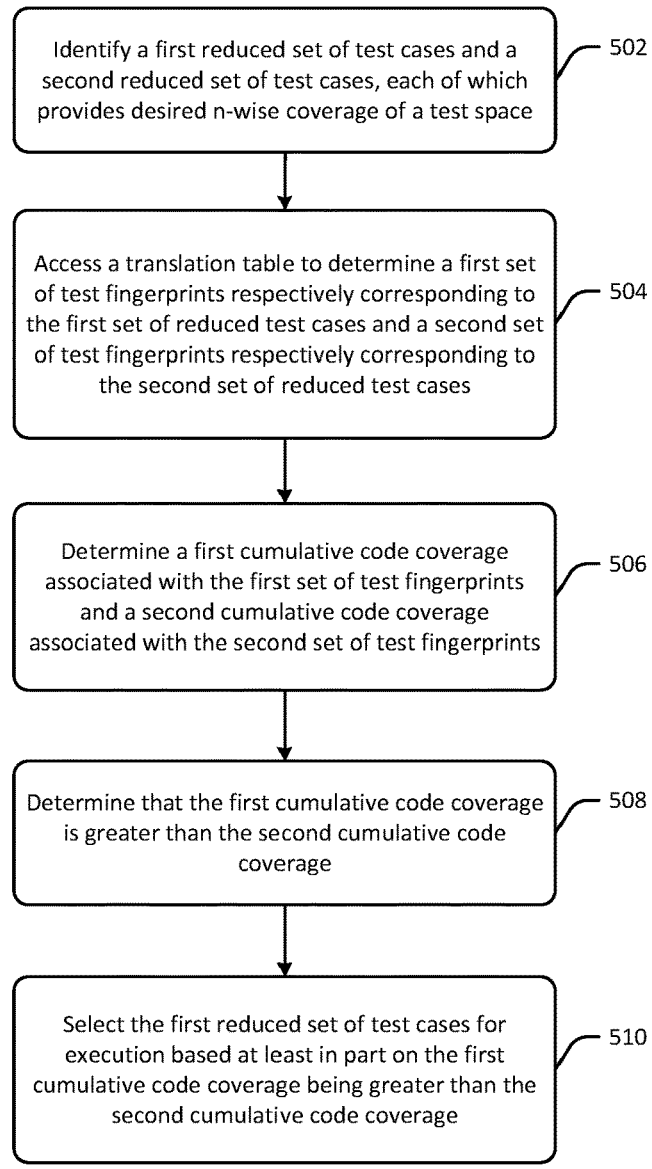
FIG. 5 is a process flow diagram of an illustrative method for selecting a reduced set of test cases for execution based on the cumulative code coverage of the reduced set of test cases in accordance with one or more example embodiments of the invention.

In addition, in example embodiments, code coverage ascertained from test fingerprints accessible via the translation table 118 may be used to determine which set of regression test cases to execute, where each set of test cases provides a desired amount of coverage of a test space. FIG. 5 is a process flow diagram of an illustrative method 500 for selecting a reduced set of test cases for execution based on the cumulative code coverage of the reduced set of test cases in accordance with one or more example embodiments of the invention.

At block 502 of the method 500, computer-executable instructions of the test case selection engine 120 may be executed to identify a first reduced set of test cases and a second reduced set of test cases, each of which provides desired n-wise coverage of a test space. In example embodiments, if an entire test space is modeled as the Cartesian product of all possible combinations of attribute values, it may be desirable to perform a reduction of the entire test space to obtain a reduced set of CTD vectors that provides a desired complete n-wise coverage of the test space but not complete coverage. As a non-limiting example, an entire test space can be reduced down to a set of CTD vectors that provides complete pairwise coverage of the test space but only partial higher-order coverage. Thus, in example embodiments, the first reduced set of test cases and the second reduced set of test cases may each provide complete pairwise coverage of the test space, but only partial 3-wise coverage, 4-wise coverage, and so forth. In addition, there are oftentimes multiple unique reduced sets of CTD vectors (and thus sets of corresponding test cases) that each provide complete n-wise coverage of a test space. Thus, in example embodiments, the first reduced set of test cases and the second reduced set of test cases may each constitute a unique combination of test cases. In particular, in example embodiments, the first reduced set of test cases may include at least one test case not present in the second reduced set of test cases or vice versa.

At block 504 of the method 500, computer-executable instructions of the test case selection engine 120 and/or computer-executable instructions of the translation table module(s) 116 may be executed to access the translation table 118 to determine a first set of test fingerprints respectively corresponding to the first reduced set of test cases and a second set of test fingerprints respectively corresponding to the second reduced set of test cases. Then, at block 506 of the method 500, a first cumulative code coverage associated with the first set of test fingerprints and a second cumulative code coverage associated with the second set of fingerprints may be determined. In particular, in example embodiments, a respective attribute seed may be determined for each test case in the first reduced set of test cases and each test case in the second reduced set of test cases, which may be then used to search the translation table 118 for correspondingly stored test fingerprints. Each retrieved test fingerprint may be deconstructed to obtain the corresponding collection of breakpoints encountered during execution of a corresponding test case. From these collections of breakpoints, the first cumulative code coverage associated with the first reduced set of test cases and the second cumulative code coverage associated with the second reduced set of test cases may be determined.

At block 508 of the method 500, computer-executable instructions of the test case selection engine 120 may be executed to determine, for example, that the first cumulative code coverage is greater than the second cumulative code coverage. That is, it may be determined at block 508 that the first set of test fingerprints (and thus the first reduced set of test cases) provides more extensive coverage of the source code 110 than the second set of test fingerprints (and thus the second reduced set of test cases). Upon making this determination, computer-executable instructions of the test case selection engine 120 may be executed at block 510 of the method 500 to select the first reduced set of test cases for execution in lieu of the second reduced set of test cases, or in the alternative, to prioritize the first reduced set of test cases for execution over the second reduced set of test cases such as in example scenarios involving constraint(s) on the execution of test cases.

One or more illustrative embodiments of the invention are described herein. Such embodiments are merely illustrative of the scope of this invention and are not intended to be limiting in any way. Accordingly, variations, modifications, and equivalents of embodiments disclosed herein are also within the scope of this invention.

Figure 6:
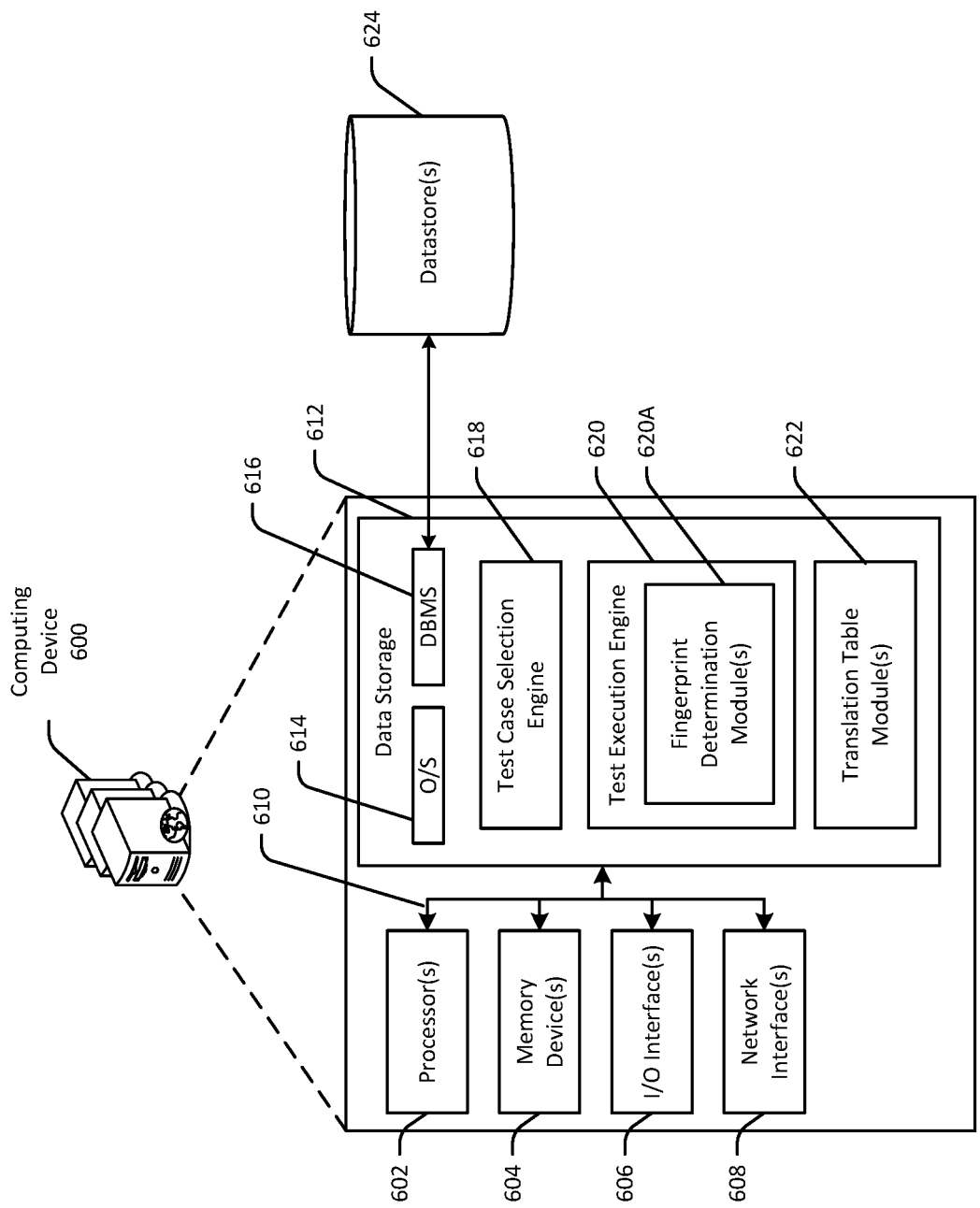
FIG. 6 is a schematic diagram of an illustrative computing device configured to implement one or more example embodiments of the invention.

FIG. 6 is a schematic diagram of an illustrative computing device 600 configured to implement one or more example embodiments of the invention. The illustrative computing device 600 may include a server or collection of servers; a personal computer; a handheld device; or the like. While the computing device 600 and/or any particular component of the computing device 600 may be described herein in the singular, it should be appreciated that multiple instances of the computing device 600 and/or any component thereof may be provided and functionality described in connection with the computing device 600 may be distributed across multiple computing devices 600 and/or across multiple instances of any particular component of the computing device 600.

In an illustrative configuration, the computing device 600 may include one or more processors (processor(s)) 602, one or more memory devices 604 (generically referred to herein as memory 604), one or more input/output ("I/O") interfaces 606, one or more network interfaces 608, and data storage 612. The computing device 600 may further include one or more buses 610 that functionally couple various components of the computing device 600.

The bus(es) 610 may include at least one of a system bus, a memory bus, an address bus, or a message bus, and may permit the exchange of information (e.g., data (including computer-executable code), signaling, etc.) between various components of the computing device 600. The bus(es) 610 may include, without limitation, a memory bus or a memory controller, a peripheral bus, an accelerated graphics port, and so forth. The bus(es) 610 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 604 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 604 may include multiple different types of memory such as various types of static random access memory (SRAM), various types of dynamic random access memory (DRAM), various types of unalterable ROM, and/or writable variants of ROM such as electrically erasable programmable read-only memory (EEPROM), flash memory, and so forth. The memory 604 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 612 may include removable storage and/or non-removable storage including, but not limited to, magnetic storage, optical disk storage, and/or tape storage. The data storage 612 may provide non-volatile storage of computer-executable instructions and other data. The memory 604 and the data storage 612, removable and/or non-removable, are examples of computer-readable storage media (CRSM) as that term is used herein.

The data storage 612 may store computer-executable code, instructions, or the like that may be loadable into the memory 604 and executable by the processor(s) 602 to cause the processor(s) 602 to perform or initiate various operations. The data storage 612 may additionally store data that may be copied to memory 604 for use by the processor(s) 602 during the execution of the computer-executable instructions. Moreover, output data generated as a result of execution of the computer-executable instructions by the processor(s) 602 may be stored initially in memory 604 and may ultimately be copied to data storage 612 for non-volatile storage.

More specifically, the data storage 612 may store one or more operating systems (O/S) 614; one or more database management systems (DBMS) 616 configured to access the memory 604 and/or one or more external datastores 624; and one or more program modules, applications, engines, managers, computer-executable code, scripts, or the like such as, for example, a test case selection engine 618, a test execution engine 620, and one or more translation table modules 622. The test execution engine 620 may include one or more sub-modules such as one or more fingerprint determination modules 620A. Any of the components depicted as being stored in data storage 612 may include any combination of software, firmware, and/or hardware. The software and/or firmware may include computer-executable instructions (e.g., computer-executable program code) that may be loaded into the memory 604 for execution by one or more of the processor(s) 602 to perform any of the operations described earlier in connection with correspondingly named modules/engines depicted in FIG. 1.

Although not depicted in FIG. 6, the data storage 612 may further store various types of data utilized by components of the computing device 600 (e.g., data stored in the datastore(s) 624). Any data stored in the data storage 612 may be loaded into the memory 604 for use by the processor(s) 602 in executing computer-executable instructions. In addition, any data stored in the data storage 612 may potentially be stored in the external datastore(s) 624 and may be accessed via the DBMS 616 and loaded in the memory 604 for use by the processor(s) 602 in executing computer-executable instructions.

The processor(s) 602 may be configured to access the memory 604 and execute computer-executable instructions loaded therein. For example, the processor(s) 602 may be configured to execute computer-executable instructions of the various program modules, applications, engines, managers, or the like of the computing device 600 to cause or facilitate various operations to be performed in accordance with one or more embodiments of the invention. The processor(s) 602 may include any suitable processing unit capable of accepting data as input, processing the input data in accordance with stored computer-executable instructions, and generating output data. The processor(s) 602 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 602 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 602 may be capable of supporting any of a variety of instruction sets.

Referring now to other illustrative components depicted as being stored in the data storage 612, the O/S 614 may be loaded from the data storage 612 into the memory 604 and may provide an interface between other application software executing on the computing device 600 and hardware resources of the computing device 600. More specifically, the O/S 614 may include a set of computer-executable instructions for managing hardware resources of the computing device 600 and for providing common services to other application programs. In certain example embodiments, the O/S 614 may include or otherwise control the execution of one or more of the program modules, engines, managers, or the like depicted as being stored in the data storage 612. The O/S 614 may include any operating system now known or which may be developed in the future including, but not limited to, any server operating system, any mainframe operating system, or any other proprietary or non-proprietary operating system.

The DBMS 616 may be loaded into the memory 604 and may support functionality for accessing, retrieving, storing, and/or manipulating data stored in the memory 604, data stored in the data storage 612, and/or data stored in external datastore(s) 624. The DBMS 616 may use any of a variety of database models (e.g., relational model, object model, etc.) and may support any of a variety of query languages. The DBMS 616 may access data represented in one or more data schemas and stored in any suitable data repository. Data stored in the datastore(s) 624 may include, for example, breakpoint values; fingerprints; source code; regression tests; attribute seeds; translation table entries; and so forth, any portion of which may alternatively or additionally be stored in the data storage 612. External datastore(s) 624 that may be accessible by the computing device 600 via the DBMS 616 may include, but are not limited to, databases (e.g., relational, object-oriented, etc.), file systems, flat files, distributed datastores in which data is stored on more than one node of a computer network, peer-to-peer network datastores, or the like. In example embodiments, the datastore(s) 624 may include the datastore(s) 106 depicted in FIG. 1.

Referring now to other illustrative components of the computing device 600, the input/output (I/O) interface(s) 606 may facilitate the receipt of input information by the computing device 600 from one or more I/O devices as well as the output of information from the computing device 600 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the computing device 600 or may be separate. The I/O devices may further include, for example, any number of peripheral devices such as data storage devices, printing devices, and so forth.

The I/O interface(s) 606 may also include an interface for an external peripheral device connection such as universal serial bus (USB), FireWire, Thunderbolt, Ethernet port or other connection protocol that may connect to one or more networks. The I/O interface(s) 606 may also include a connection to one or more antennas to connect to one or more networks via a wireless local area network (WLAN) (such as Wi-Fi) radio, Bluetooth, and/or a wireless network radio, such as a radio capable of communication with a wireless communication network such as a Long Term Evolution (LTE) network, WiMAX network, 3G network, etc.

The computing device 600 may further include one or more network interfaces 608 via which the computing device 600 may communicate with any of a variety of other systems, platforms, networks, devices, and so forth. The network interface(s) 608 may enable communication, for example, with one or more other devices via one or more of networks. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC)

medium, a microwave medium, a radio frequency communication medium, a satellite communication medium, or any combination thereof.

It should be appreciated that the program modules/engines depicted in FIG. 6 as being stored in the data storage 612 are merely illustrative and not exhaustive and that processing described as being supported by any particular module may alternatively be distributed across multiple modules, engines, or the like, or performed by a different module, engine, or the like. In addition, various program module(s), script(s), plug-in(s), Application Programming Interface(s) (API(s)), or any other suitable computer-executable code hosted locally on the computing device 600 and/or other computing devices may be provided to support functionality provided by the modules depicted in FIG. 6 and/or additional or alternate functionality. Further, functionality may be modularized in any suitable manner such that processing described as being performed by a particular module may be performed by a collection of any number of program modules, or functionality described as being supported by any particular module may be supported, at least in part, by another module. In addition, program modules that support the functionality described herein may be executable across any number of cluster members in accordance with any suitable computing model such as, for example, a client-server model, a peer-to-peer model, and so forth. In addition, any of the functionality described as being supported by any of the modules depicted in FIG. 4 may be implemented, at least partially, in hardware and/or firmware across any number of devices.

It should further be appreciated that the computing device 600 may include alternate and/or additional hardware, software, or firmware components beyond those described or depicted without departing from the scope of the invention. More particularly, it should be appreciated that software, firmware, or hardware components depicted as forming part of the computing device 600 are merely illustrative and that some components may not be present or additional components may be provided in various embodiments. While various illustrative modules have been depicted and described as software modules stored in data storage 612, it should be appreciated that functionality described as being supported by the modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional program modules and/or engines not depicted may be present and may support at least a portion of the described functionality and/or additional functionality.

One or more operations of the method 400 and/or the method 500 may be performed by one or more computing devices 600 having the illustrative configuration depicted in FIG. 6, or more specifically, by one or more program modules, engines, applications, or the like executable on such a device. It should be appreciated, however, that such operations may be implemented in connection with numerous other device configurations.

The operations described and depicted in the illustrative methods of FIGS. 3, 4, and 5 may be carried out or performed in any suitable order as desired in various example embodiments of the invention. Additionally, in certain example embodiments, at least a portion of the operations may be carried out in parallel. Furthermore, in certain example embodiments, less, more, or different operations than those depicted in FIGS. 3, 4, and 5 may be performed.

Although specific embodiments of the invention have been described, one of ordinary skill in the art will recognize that numerous other modifications and alternative embodiments are within the scope of the invention. For example, any of the functionality and/or processing capabilities described with respect to a particular system, system component, device, or device component may be performed by any other system, device, or component. Further, while various illustrative implementations and architectures have been described in accordance with embodiments of the invention, one of ordinary skill in the art will appreciate that numerous other modifications to the illustrative implementations and architectures described herein are also within the scope of this invention. In addition, it should be appreciated that any operation, element, component, data, or the like described herein as being based on another operation, element, component, data, or the like may be additionally based on one or more other operations, elements, components, data, or the like. Accordingly, the phrase "based on," or variants thereof, should be interpreted as "based at least in part on."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for associating a particular test case with a particular test fingerprint indicative of code coverage of the particular test case, the method comprising:
    executing the particular test case;
    determining a code path traversed during execution of the particular test case;
    determining a collection of breakpoints encountered during traversal of the code path;
    determining the particular test fingerprint corresponding to the particular test case based at least in part on the collection of breakpoints;
    determining an attribute seed associated with the particular test case; and
    storing an association between the attribute seed and the particular test fingerprint,
    wherein storing the association between the attribute seed and the particular test fingerprint comprises populating a translation table with an entry storing the association;
    determining a desired amount of cumulative code coverage; and
    selecting and executing a group of test cases to execute to obtain the desired amount of cumulative code coverage, wherein the group of test cases comprises the particular test case.

2. The computer-implemented method of claim 1, selecting the group of test cases comprises:
    determining a group of test fingerprints respectively corresponding to the group of test cases based at least in part on a respective stored association between a respective attribute seed associated with each test case in the group of test cases and a corresponding test fingerprint in the group of test fingerprints; and
    determining that the group of test fingerprints provides the desired amount of cumulative code coverage.

3. The computer-implemented method of claim 2, wherein determining that the group of test fingerprints provides the desired amount of cumulative code coverage comprises:
    determining a cumulative number of breakpoints represented by the group of test fingerprints; and determining that the cumulative number of breakpoints provide a cumulative code coverage that is at least as large as the desired amount of cumulative code coverage.

4. The computer-implemented method of claim 3, wherein determining the cumulative number of breakpoints represented by the group of test fingerprints comprises identifying, from each test fingerprint in the group of test fingerprints, a respective number of unique breakpoints encountered during execution of a corresponding test case of the group of test cases.

5. The computer-implemented method of claim 1, further comprising:
 identifying a first group of test cases and a second group of test cases, each group of test cases providing a desired coverage of a test space;
 determining a first group of test fingerprints respectively corresponding to the first group of test cases and a second group of test fingerprints respectively corresponding to the second group of test cases;
 determining a first cumulative code coverage associated with the first group of test fingerprints and a second cumulative code coverage associated with the second group of test fingerprints;
 determining that the first cumulative code coverage is greater than the second cumulative code coverage; and
 selecting the first group of test cases for execution based at least in part on determining that the first cumulative code coverage is greater than the second cumulative code coverage.

6. The computer-implemented method of claim 1, wherein the attribute seed is indicative of a combination of attribute-value pairs tested by the particular test case.

7. A system for associating a particular test case with a particular test fingerprint indicative of code coverage of the particular test case, the system comprising:
 at least one processor; and
 at least one memory storing computer-executable instructions, wherein the at least one processor is configured to access the at least one memory and execute the computer-executable instructions to:
  execute the particular test case;
  determine a code path traversed during execution of the particular test case;
  determine a collection of breakpoints encountered during traversal of the code path;
  determine the particular test fingerprint corresponding to the particular test case based at least in part on the collection of breakpoints;
  determine an attribute seed associated with the particular test case; and
  store an association between the attribute seed and the particular test fingerprint, wherein storing the association between the attribute seed and the particular test fingerprint comprises populating a translation table with an entry storing the association;
  determine a desired amount of cumulative code coverage; and
  select and executing a group of test cases to execute to obtain the desired amount of cumulative code coverage, wherein the group of test cases comprises the particular test case.

8. The system of claim 7, wherein the at least one processor is configured to select the group of test cases by executing the computer-executable instructions to:
 determine a group of test fingerprints respectively corresponding to the group of test cases based at least in part on a respective stored association between a respective attribute seed associated with each test case in the group of test cases and a corresponding test fingerprint in the group of test fingerprints; and
 determine that the group of test fingerprints provides the desired amount of cumulative code coverage.

9. The system of claim 8, wherein the at least one processor is configured to determine that the group of test fingerprints provides the desired amount of cumulative code coverage by executing the computer-executable instructions to:
 determine a cumulative number of breakpoints represented by the group of test fingerprints; and
 determine that the cumulative number of breakpoints provide a cumulative code coverage that is at least as large as the desired amount of cumulative code coverage.

10. The system of claim 9, wherein the at least one processor is configured to determine the cumulative number of breakpoints represented by the group of test fingerprints by executing the computer-executable instructions to identify, from each test fingerprint in the group of test fingerprints, a respective number of unique breakpoints encountered during execution of a corresponding test case of the group of test cases.

11. The system of claim 7, wherein the at least one processor is further configured to execute the computer-executable instructions to:
 identify a first group of test cases and a second group of test cases, each group of test cases providing a desired coverage of a test space;
 determine a first group of test fingerprints respectively corresponding to the first group of test cases and a second group of test fingerprints respectively corresponding to the second group of test cases;
 determine a first cumulative code coverage associated with the first group of test fingerprints and a second cumulative code coverage associated with the second group of test fingerprints;
 determine that the first cumulative code coverage is greater than the second cumulative code coverage; and
 select the first group of test cases for execution based at least in part on determining that the first cumulative code coverage is greater than the second cumulative code coverage.

12. The system of claim 7, wherein the attribute seed is indicative of a combination of attribute-value pairs tested by the particular test case.

13. A computer program product for associating a particular test case with a particular test fingerprint indicative of code coverage of the particular test case, the computer program product comprising a computer readable storage medium having program instructions embodied therewith, the program instructions readable by a processing circuit to cause the processing circuit to perform a method comprising:
 executing the particular test case;
 determining a code path traversed during execution of the particular test case;
 determining a collection of breakpoints encountered during traversal of the code path;
 determining the particular test fingerprint corresponding to the particular test case based at least in part on the collection of breakpoints;

determining an attribute seed associated with the particular test case; and storing an association between the attribute seed and the particular test fingerprint, wherein storing the association between the attribute seed and the particular test fingerprint comprises populating a translation table with an entry storing the association;

determining a desired amount of cumulative code coverage; and selecting and executing a group of test cases to execute to obtain the desired amount of cumulative code coverage, wherein the group of test cases comprises the particular test case.

14. The computer program product of claim 13, wherein selecting the group of test cases comprises:

determining a group of test fingerprints respectively corresponding to the group of test cases based at least in part on a respective stored association between a respective attribute seed associated with each test case in the group of test cases and a corresponding test fingerprint in the group of test fingerprints; and determining that the group of test fingerprints provides the desired amount of cumulative code coverage.

15. The computer program product of claim 14, wherein determining that the group of test fingerprints provides the desired amount of cumulative code coverage comprises:

determining a cumulative number of breakpoints represented by the group of test fingerprints; and determining that the cumulative number of breakpoints provide a cumulative code coverage that is at least as large as the desired amount of cumulative code coverage.

16. The computer program product of claim 15, wherein determining the cumulative number of breakpoints represented by the group of test fingerprints comprises identifying, from each test fingerprint in the group of test fingerprints, a respective number of unique breakpoints encountered during execution of a corresponding test case of the group of test cases.

17. The computer program product of claim 13, the method further comprising:

identifying a first group of test cases and a second group of test cases, each group of test cases providing a desired coverage of a test space;

determining a first group of test fingerprints respectively corresponding to the first group of test cases and a second group of test fingerprints respectively corresponding to the second group of test cases;

determining a first cumulative code coverage associated with the first group of test fingerprints and a second cumulative code coverage associated with the second group of test fingerprints;

determining that the first cumulative code coverage is greater than the second cumulative code coverage; and selecting the first group of test cases for execution based at least in part on determining that the first cumulative code coverage is greater than the second cumulative code coverage.

* * * * *